(12) United States Patent
Porten et al.

(10) Patent No.: US 7,712,457 B2
(45) Date of Patent: May 11, 2010

(54) METHOD FOR TAKING INTO ACCOUNT THE OUTGASSING OF FUEL FROM THE ENGINE OIL OF AN INTERNAL COMBUSTION ENGINE

(75) Inventors: Guido Porten, Vaihingen/Enz (DE); Markus Amler, Leonberg-Gebersheim (DE); Corren Heimgaertner, Stuttgart (DE); Andreas Kufferath, Besigheim (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 12/203,560

(22) Filed: Sep. 3, 2008

(65) Prior Publication Data

US 2009/0064970 A1    Mar. 12, 2009

(30) Foreign Application Priority Data

Sep. 6, 2007   (DE) .................. 10 2007 042 406

(51) Int. Cl.
*F02B 25/06* (2006.01)
*F02D 41/00* (2006.01)

(52) U.S. Cl. ...................... 123/572; 123/704
(58) Field of Classification Search ............ 123/406.19, 123/572, 704
See application file for complete search history.

(56) References Cited

U.S. PATENT DOCUMENTS

| 3,800,754 | A | * | 4/1974 | Carlson et al. .......... 123/73 CB |
| 5,331,940 | A | * | 7/1994 | Takayama ................... 123/679 |
| 5,546,918 | A | * | 8/1996 | Mayer et al. ................ 123/674 |
| 5,813,224 | A | * | 9/1998 | Rao et al. ..................... 60/274 |
| 6,098,605 | A | * | 8/2000 | Brooks ........................ 123/680 |
| 6,318,075 | B1 | * | 11/2001 | Gunther et al. ............... 60/285 |
| 6,491,024 | B1 | * | 12/2002 | Connolly et al. ....... 123/406.19 |
| 7,311,094 | B2 | * | 12/2007 | Mallebrein et al. .......... 123/698 |
| 2005/0072041 | A1 | * | 4/2005 | Guinther et al. ............... 44/359 |
| 2006/0137667 | A1 | * | 6/2006 | Alexander Ketterer ...... 123/674 |

FOREIGN PATENT DOCUMENTS

JP        2004225652        9/2009

* cited by examiner

*Primary Examiner*—Stephen K Cronin
*Assistant Examiner*—David Hamaoui
(74) *Attorney, Agent, or Firm*—Merchant & Gould P.C.

(57) ABSTRACT

The invention deals with a method for operating an internal combustion engine with engine oil as the lubricant and a fuel supply by means of direct injection, wherein an air number (lambda) of a fuel-air mixture supplied to the internal combustion engine is determined. Provision is made in the method according to the invention for the internal combustion engine to be transferred to an operating state with higher fuel consumption, when a low air number (lambda) is detected in driving conditions with a high percentage of fuel ingress from a crankcase ventilation system into the fuel-air mixture. By means of this increase in the fuel requirement, the fuel, which exited the engine oil into the intake air of the internal combustion engine, can be combusted; and an increase in the exhaust gas emissions by means of incompletely combusted fuel, in which typically hydrocarbons and carbon dioxide arise, can be avoided. In a warm-up phase of the internal combustion engine, the fuel, which ingressed into the engine oil, can thus likewise be combusted, even if under certain temperature-time conditions, particularly in the partial load operating mode and during idling, more fuel is present in the fuel-air mixture than is actually required for operating the internal combustion engine.

10 Claims, No Drawings

METHOD FOR TAKING INTO ACCOUNT THE OUTGASSING OF FUEL FROM THE ENGINE OIL OF AN INTERNAL COMBUSTION ENGINE

TECHNICAL FIELD

The invention deals with a method for operating an internal combustion engine with engine oil as the lubricant and a fuel supply by means of direct injection, wherein an air number (lambda) of a fuel-air mixture supplied to the internal combustion engine is determined.

BACKGROUND

Internal combustion engines on the basis of gasoline engines are generally operated with fuel from hydrocarbons produced from fossil fuels based on refined crude oil. Ethanol produced from renewable resources (plants) or another kind of alcohol is increasingly being added in various mixing ratios to the fuel. In the USA and Europe a mixture of 75-85% ethanol and 15-25% gasoline is often distributed under the trade name E85. The internal combustion engines are designed in such a way that they can be operated with pure gasoline as well as with mixtures up to E85 or even pure ethanol (E100). This is denoted as a "flex-fuel operation". The operating parameters in the flex-fuel operation have to be adapted in each case to the existing fuel mixture for an efficient operation with only a small discharge of toxic emissions; while at the same time high engine performance is guaranteed. A stoichiometric fuel-air mixture ratio is, for example, present at 14.7 mass parts of air per part of gasoline; however, when using pure ethanol, a proportion of air of 9 mass parts must be set.

The taking into account of the fuel, which has ingressed into the engine oil during cold starting, and the fuel evaporating out of the engine oil at high temperatures has to fundamentally take place with all internal combustion engines; however, is mainly employed with gasoline engines with a flex-fuel-mode of operation.

Ethanol and gasoline have different evaporation properties. Ethanol evaporates at a lower temperature to a lesser degree than gasoline, so that more ethanol has to be injected during cold starting than is the case for gasoline. When low ambient temperatures prevail in the winter months, this effect is again increased. This leads to the fact that when cold starting with ethanol and during the subsequent warm-up phase, considerably more fuel is wiped from the cylinder walls into the engine oil by the piston rings. When the temperature of the engine oil increases, this fuel evaporates and is added via the crankcase ventilation system to the fresh air supply provided to the engine by way of the intake manifold. The total amount of fuel situated in the engine oil is only expelled during extended warm-up phases. The additional richening of the mixture caused by the evaporated fuel has to be taken into account. Especially during low load-rotational speed-conditions, this richening can be significant. During idling with the engine operating with gasoline, the richening of the mixture from the outgassing of fuel can definitely reach 30%. At a low temperature, ethanol evaporates out of the oil to a greater extent than gasoline. For this reason, the richening of the fuel mixture by the outgassing of fuel can even be higher in this instance during a flex-fuel mode of operation. The richening of the fuel mixture can be taken into account by the closed-loop lambda control at certain percentages. This can, however, be insufficient in certain cases and lead to a degradation of the exhaust gas emission values with undesirably high values of hydrocarbons and carbon monoxide on account of the overall mixture being too rich.

It is the task of the invention to provide a method, which allows for an improved way of taking into account the outgassing of fuel from the engine oil of an internal combustion engine and which also brings about the combustion of the fuel-air mixture with lower exhaust gas emissions when the outgassing of fuel from the engine oil is high.

SUMMARY

The task of the invention is thereby solved; in that when a low air number (lambda) is detected in driving conditions with a high percentage of fuel ingress from a crankcase ventilation system into the fuel-air mixture, the internal combustion engine is transferred to an operating state with higher fuel consumption. By means of this increase in the fuel requirement, the fuel, which exited the engine oil into the intake air of the internal combustion engine, can be combusted; and an increase in the exhaust gas emissions by means of incompletely combusted fuel, in which typically hydrocarbons and carbon dioxide arise, can be avoided. In a warm-up phase of the internal combustion engine, the fuel, which ingressed into the engine oil, can thus likewise be combusted, even if under certain temperature-time conditions, particularly in the partial load operating mode and during idling, more fuel is present in the fuel-air mixture than is actually required for operating the internal combustion engine.

Provision is made in a preferred form of embodiment for an operating state of the engine with a higher engine load to be selected as the operating state with higher fuel consumption.

The method can be implemented without compromising driving comfort, in that the operating state with higher fuel consumption essentially produces the same torque at the crankshaft as the previous operating state.

If in order to bring about the operating state with higher fuel consumption, the ignition timing is displaced in the direction of a retarded ignition angle, the degree of efficiency of the internal combustion engine can be reduced, and the fuel requirement is thereby increased without the power output and the torque at the crankshaft increasing. In so doing, without impairing the driver of the motor vehicle, the short-term fuel supply, which is too high, can be combusted without compromising the exhaust gas emission values. When implementing this step, attention must be paid to the fact that the exhaust gas temperature is thereby increased and that this leads to an intensified heating up of the exhaust gas system with its associated components, like catalytic converters. The limits of the operating temperatures for these components must consequently be taken into account.

If the fuel supply is divided into several injection events per cycle of the internal combustion engine; and if in order to bring about the operating state with higher fuel consumption, a portion of the injection events is displaced in the direction of a retarded ignition angle, ignition angles, which are exceedingly retarded (as, for example, 20-30 degrees after top dead center of the cylinder travel), can be implemented.

The method according to the invention for operating an internal combustion engine can especially be advantageously used to drive a motor vehicle with a fuel mixture of gasoline and ethanol. Particularly during start-up of the internal combustion engine when the ambient temperature and/or the operating temperature is low and when operating the engine with an ethanol rich fuel as E85 or E100, a large injected fuel quantity is required. This, however, causes a large ingress of fuel into the engine oil, because said fuel condenses on the cold cylinder walls and is wiped by the piston rings into the oil. During subsequent operating phases with higher temperatures, the fuel exits the engine oil through evaporation and is supplied via the crankcase ventilation system to the air intake of the internal combustion engine. Ethanol in the engine oil already exits said oil through evaporation in large amounts at lower temperatures than gasoline, so that the method according to the invention can be especially advantageously employed in the flex-fuel mode of operation with ethanol rich fuel.

The invention claimed is:

1. A method of operating an internal combustion engine with an engine oil as a lubricant and a direct injection fuel supply, the method comprising:
   determining an air number of a fuel-air mixture supplied to the internal combustion engine, wherein a low air number is detected in conditions with a high percentage of fuel ingress from a crankcase ventilation system; and
   transferring the internal combustion engine to an increased engine load operating state with a higher fuel consumption upon the detection of a low air number.

2. A method according to claim 1, wherein the increased engine load operating state with higher fuel consumption essentially produces the same torque at a crankshaft as a previous operating state.

3. A method according claim 1, further comprising displacing an ignition timing in a direction of a retarded ignition angle in order to bring about the increased engine load operating state with the higher fuel consumption.

4. A method according to claim 1, wherein the fuel supply is divided into at least several injection events per cycle of the internal combustion engine; and wherein in order to bring about the increased engine load operating state with the higher fuel consumption, a portion of said injection events are displaced in a direction of a retarded ignition angle.

5. A method according to claim 1, wherein the internal combustion engine is used to drive a motor vehicle, and wherein the fuel supply is a fuel mixture of gasoline and alcohol.

6. A method of operating an internal combustion engine, the method comprising steps of:
   determining an air number of a fuel-air mixture supplied to the internal combustion engine, wherein a low air number is detected in conditions with a high percentage of fuel ingress; and
   increasing engine load of the internal combustion engine in response to the detection of a low air number to increase fuel consumption.

7. A method according to claim 6, wherein the internal combustion engine produces the same torque at a crankshaft after increasing engine load as before increasing engine load.

8. A method according to claim 6, wherein the step of increasing engine load includes displacing an ignition timing in a direction of a retarded ignition angle.

9. A method according to claim 6, wherein the internal combustion engine includes a fuel supply divided into at least several injection events per cycle of the internal combustion engine, and wherein the step of increasing engine load includes displacing a portion of the injection events in a direction of a retarded ignition angle.

10. A method according to claim 6, wherein the internal combustion engine drives a motor vehicle, and wherein the internal combustion engine has a fuel supply with a fuel mixture of gasoline and alcohol.

* * * * *

UNITED STATES PATENT AND TRADEMARK OFFICE
CERTIFICATE OF CORRECTION

PATENT NO. : 7,712,457 B2
APPLICATION NO. : 12/203560
DATED : May 11, 2010
INVENTOR(S) : Porten et al.

It is certified that error appears in the above-identified patent and that said Letters Patent is hereby corrected as shown below:

Col. 3, line 22, claim 2: "state with higher fuel" should read --state with the higher fuel--

Col. 3, line 26, claim 3: "method according claim 1," should read --method according to claim 1,--

Signed and Sealed this

Ninth Day of November, 2010

David J. Kappos
*Director of the United States Patent and Trademark Office*